United States Patent
Stevens et al.

(10) Patent No.: US 8,522,524 B2
(45) Date of Patent: Sep. 3, 2013

(54) COMPRESSOR FOR PRESSURISING CARBON DIOXIDE

(75) Inventors: Aaron J. Stevens, Derby (GB); David S. Knott, Loughborough (GB)

(73) Assignee: Rolls-Royce, PLC, London (GB)

(*) Notice: Subject to any disclaimer, the term of this patent is extended or adjusted under 35 U.S.C. 154(b) by 343 days.

(21) Appl. No.: 13/121,303

(22) PCT Filed: Aug. 19, 2009

(86) PCT No.: PCT/EP2009/005998
§ 371 (c)(1), (2), (4) Date: Mar. 28, 2011

(87) PCT Pub. No.: WO2010/037448
PCT Pub. Date: Apr. 8, 2010

(65) Prior Publication Data
US 2011/0174401 A1    Jul. 21, 2011

(30) Foreign Application Priority Data
Oct. 3, 2008 (GB) .................................. 0818048

(51) Int. Cl.
*F02C 7/00* (2006.01)
*F01B 25/00* (2006.01)

(52) U.S. Cl.
USPC ................. 60/39.5; 137/565.29; 137/565.33

(58) Field of Classification Search
USPC ............. 137/565.29, 565.33; 60/39.5, 39.52, 60/39.41
See application file for complete search history.

(56) References Cited

U.S. PATENT DOCUMENTS

| 5,457,963 | A | 10/1995 | Cahill-O'Brien et al. |
|---|---|---|---|
| 6,170,264 | B1 * | 1/2001 | Viteri et al. .................... 60/671 |
| 6,868,677 | B2 * | 3/2005 | Viteri et al. .................... 60/39.5 |
| 7,083,658 | B2 * | 8/2006 | Andrus, Jr. et al. ............. 48/101 |
| 7,937,948 | B2 * | 5/2011 | Zubrin et al. .................. 60/780 |
| 2001/0015061 | A1 | 8/2001 | Viteri et al. |
| 2003/0131582 | A1 | 7/2003 | Anderson et al. |
| 2003/0188863 | A1 | 10/2003 | Gilbert et al. |
| 2004/0200618 | A1 | 10/2004 | Piekenbrock |
| 2007/0276542 | A1 | 11/2007 | Coward |
| 2008/0104939 | A1 | 5/2008 | Hoffmann et al. |
| 2008/0155958 | A1 | 7/2008 | Ramakrishnan et al. |
| 2011/0289930 | A1 * | 12/2011 | Draper ........................... 60/39.5 |
| 2012/0131897 | A1 * | 5/2012 | Gonzalez et al. ............. 60/39.5 |

FOREIGN PATENT DOCUMENTS

| CN | 201201901 Y | 3/2009 |
|---|---|---|
| EP | 0 851 331 A1 | 7/1998 |
| WO | WO 97/07329 A1 | 2/1997 |
| WO | WO 99/41490 A1 | 8/1999 |
| WO | WO 03/049122 A3 | 6/2003 |

OTHER PUBLICATIONS

British Search Report in British Application No. GB0818048.1; dated Feb. 2, 2009.
International Search Report in International Application No. PCT/EP2009/005998; dated Feb. 8, 2011.
Written Opinion of the International Searching Authority International Application No. PCT/EP2009/005998; dated Feb. 8, 2011.

* cited by examiner

*Primary Examiner* — John Rivell
(74) *Attorney, Agent, or Firm* — Oliff & Berridge, PLC

(57) ABSTRACT

A compressor is provided for pressurizing carbon dioxide produced by a carbon dioxide production plant and introducing the pressurized carbon dioxide to a carbon dioxide sequestration system. The compressor has a measuring system which determines the amount of carbon dioxide produced by the production plant. It also has a control system which varies the power of the compressor depending on the determined amount of produced carbon dioxide.

6 Claims, 1 Drawing Sheet

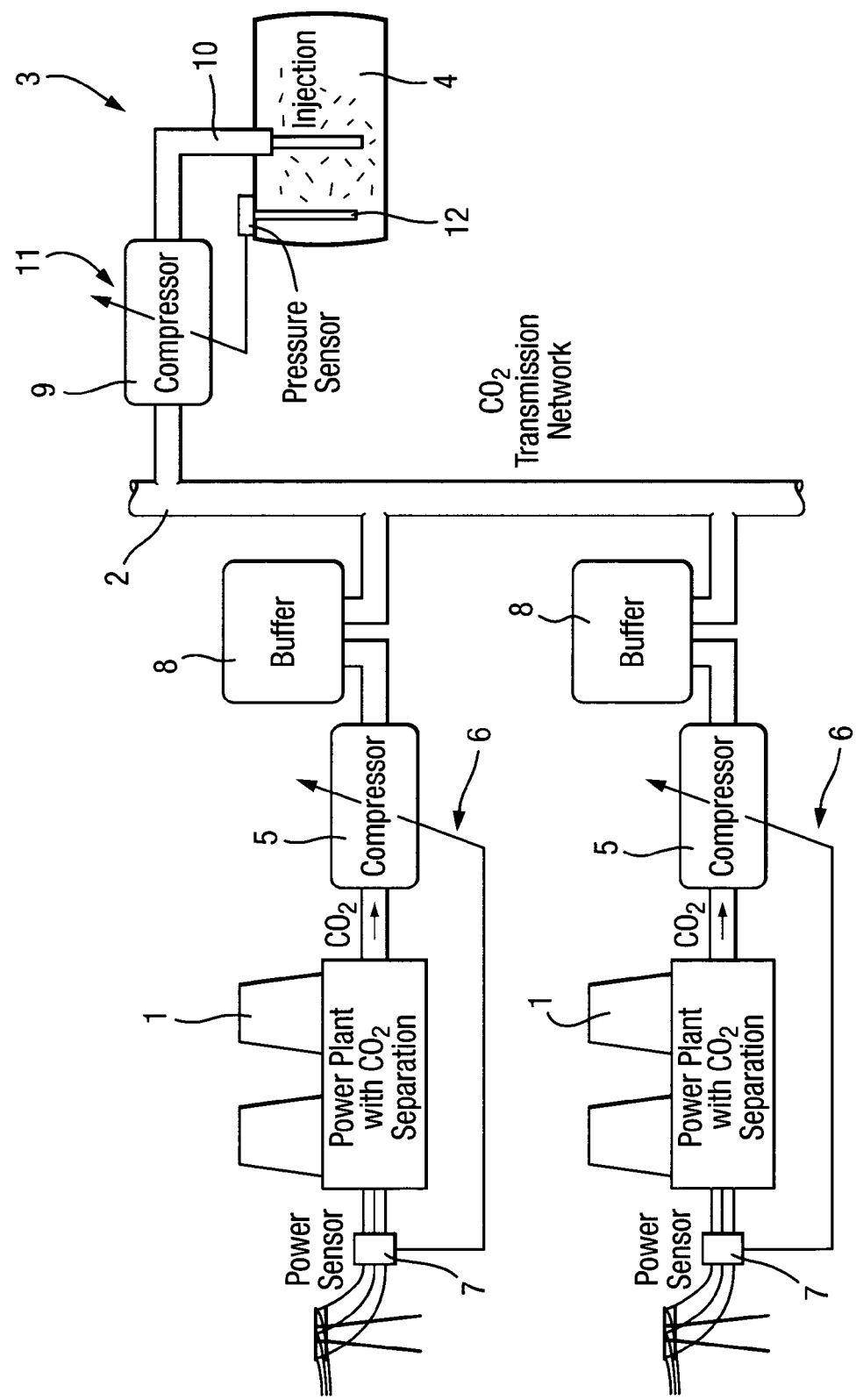

COMPRESSOR FOR PRESSURISING CARBON DIOXIDE

The present invention relates to a compressor for pressurising carbon dioxide, preferably as part of a carbon dioxide sequestration system.

Carbon dioxide capture and storage (CCS) has been proposed as an approach for reducing greenhouse gas emissions from the use of fossil fuels.

CCS involves capturing and compressing carbon dioxide at large scale carbon dioxide producers, such as fossil-fuel power plant, and transporting the captured carbon dioxide to facilities at which the carbon dioxide is stored in such a way that its release into the atmosphere is prevented. For example, storage facilities may sequestrate the carbon dioxide by injection into oil and gas field formations, coal seams or saline water-bearing formations. Alternatively, the carbon dioxide may be sequestrated by reaction with magnesium and calcium containing minerals to form stable carbonates.

US 2003/0188863 proposes a carbon dioxide pipeline network for collecting and delivering carbon dioxide to carbon dioxide consumption facilities, but provides little detail on how systems within the network would operate.

The present invention is at least partly based on the realisation that compressors can have significant control issues if used for (i) pressurising carbon dioxide produced by a carbon dioxide production plant and introducing the pressurised carbon dioxide to a sequestration system and (ii) pressurising carbon dioxide at carbon dioxide storage facilities.

Thus, a first aspect of the invention provides a compressor for pressurising carbon dioxide produced by a carbon dioxide production plant (such as a fossil fuel power station) and introducing the pressurised carbon dioxide to a carbon dioxide sequestration system, wherein the compressor has:

a measuring system which determines the amount of carbon dioxide produced by the production plant, and a control system which varies the power of the compressor depending on the determined amount of produced carbon dioxide.

By providing a compressor with such a measuring system and control system, it is possible for the compressor to adapt to variations in the carbon dioxide emissions from the plant. The compressor can then operate effectively and efficiently. That is, the compressor's operating condition can be matched to the plant's output. Without such systems, the compressor might be limited to use with a plant which operates at a constant output.

Typically, the production plant is a fossil fuel power station. The measuring system can then include a power sensor which measures the power output of the power station. As the power output of the station should relate to the carbon dioxide production rate of the station, this provides a convenient means to determine the amount of produced carbon dioxide.

However, the measuring system can include a carbon dioxide detector which measures more directly the amount of carbon dioxide produced by the plant. For example, suitable measuring signals can be obtained from power station boilers, air intake flow sensors, flue gas flow rate sensors etc. Alternatively or additionally the measuring system can determine the amount of carbon dioxide produced by the plant from control signals used to operate the plant.

The approach by which the production plant captures the carbon dioxide before it is sent to the compressor is not limited. For example, a power station production plant may implement oxyfuel, precombustion or postcombustion technology.

Preferably the control system further varies the power of the compressor depending on a predetermined pressure to be achieved (i.e. a "set" point) in the sequestration system into which the pressurised carbon dioxide is introduced. Thus compressor power can thus be matched to both its input condition and desired output condition.

A second aspect of the invention provides a compressor for pressurising carbon dioxide, received from a carbon dioxide source, at a carbon dioxide storage facility at which the pressurised carbon dioxide is injected into a carbon dioxide storage medium, wherein the compressor has:

a measuring system which determines the pressure in the formation, and a control system which varies the power of the compressor depending on the determined formation pressure. The carbon dioxide storage medium can be, for example, a geological formation such as an oil or gas field formation (such as a depleted hydrocarbon containing formation), a coal seam or a saline water-bearing formation.

Thus in this aspect, the compressor is typically for use at a storage side of a carbon dioxide sequestration system. For example, the carbon dioxide source can be a pipeline network transporting carbon dioxide from carbon dioxide production plant.

By providing a compressor with such a measuring system and control system, it is possible for the compressor to adapt to changes in the pressure in the carbon dioxide storage medium. Again, this can allow the compressor to operate effectively and efficiently.

The measuring system may include a pressure sensor in the carbon dioxide storage medium which measures the storage medium pressure directly. Alternatively or additionally, the measuring system may include a clock and a look up table which specifies how the storage medium pressure is expected to change with time. Alternatively or additionally the measuring system may include a meter which measures the total amount of carbon dioxide injected into the storage medium, which can then be related to the expected storage medium pressure.

Preferably the measuring system further determines the pressure of carbon dioxide received from the carbon dioxide source, the control system also varying the power of the compressor depending on the determined source pressure.

A third aspect of the invention provides a carbon dioxide sequestration system having:

one or more carbon dioxide production plants, one or more carbon dioxide storage facilities, and a pipeline network connecting the production plants to the storage plants;

wherein the or each production plant has a compressor according to the first aspect of the invention which pressurises carbon dioxide produced by the production plant and introduces the pressurised carbon dioxide to the pipeline network.

The or each production plant may have a carbon dioxide storage buffer between the production plant and its respective compressor. This can allow the system to better accommodate transients in the amount of carbon dioxide produced, for example, when ramping up or down the power of a power station production plant.

The or each carbon dioxide storage facility may have a compressor according to the second aspect of the invention which pressurises carbon dioxide received from the pipeline network, the storage facility injecting the pressurised carbon dioxide into a carbon dioxide storage medium such as a geological formation.

Again, to allow the system to better accommodate transients the or each storage facility may have a carbon dioxide storage buffer, the storage facility compressor sending the pressurised carbon dioxide to the respective buffer before the pressurised carbon dioxide is injected into the storage medium.

Indeed, the pipeline network may have one or more carbon dioxide storage buffers for regulating carbon dioxide pressure on the network. Such buffers can be located, for example between the compressor of a production plant and the pipeline network for further improving the accommodation of transients.

A fourth aspect of the invention provides a carbon dioxide sequestration system having:
one or more carbon dioxide production plants,
one or more carbon dioxide storage facilities, and
a pipeline network connecting the production plants to the storage plants;
wherein the or each carbon dioxide storage facility has a compressor according to the second aspect of the invention which pressurises carbon dioxide received from pipeline network, the storage facility injecting the pressurised carbon dioxide into a carbon dioxide storage medium (such as a geological formation). As described above, the or each storage facility may have a carbon dioxide storage buffer, and/or the pipeline network may have one or more carbon dioxide storage buffers.

Further aspects of the invention provide (i) a carbon dioxide production plant having the compressor of the first aspect, (ii) use of the compressor of the first aspect for compressing carbon dioxide from a carbon dioxide production plant, (iii) a carbon dioxide storage facility at which pressurised carbon dioxide is injected into a carbon dioxide storage medium, the facility having the compressor of the second aspect, and (iv) use of the compressor of the second aspect for compressing carbon dioxide at a carbon dioxide storage facility at which the pressurised carbon dioxide is injected into a carbon dioxide storage medium.

Embodiments of the invention will now be described by way of example with reference to the accompanying drawings in which:

FIG. 1 shows a schematic diagram of a carbon dioxide sequestration system.

FIG. 1 shows a schematic diagram of a carbon dioxide sequestration system. The system has carbon dioxide producing, fossil fuel power plants 1 which capture their carbon dioxide. The captured carbon dioxide is sent to a pipeline network 2 which transports the carbon dioxide to a storage facility 3. At the storage facility the carbon dioxide is injected into a geological formation 4, which is an example of a carbon dioxide storage medium.

Each power plant has a compressor 5 which pressurizes the captured carbon dioxide before it is sent to the pipeline network. Each compressor has a control system 6 which varies the power of the compressor, and a measuring system 7 which measures the power generated by the respective plant. The control system acts upon a signal received by the measuring system so that as the power generated by the respective plant varies, the power of the compressor also varies. Because the generated power is related to the carbon dioxide production rate of the plant, this has the effect of matching the operating point of the compressor to the plant's carbon dioxide production rate.

For example, in the case of a 2 GW power plant, operating at 2 GW power output, the compressor can be set to compress the maximum amount of carbon dioxide. However, when the power plant reduces its capacity down to 100 MW, the compressor power will also decrease.

If the power of the compressor were not capable of being varied when the power plant output changes, the compressor would at times be improperly matched to the carbon dioxide production rate. This could lead to compressor failure or stoppage, and/or accidental release of carbon dioxide.

As well as allowing the compressor to function efficiently and effectively, controlling the compressor power in this way can assist the pipeline network to maintain stable carbon dioxide transmission conditions.

The compressor control system 6, while being driven by the carbon dioxide production rate (indirectly, via power measurements) can also be influenced by a "set" point of the carbon dioxide pipeline network pressure. This can be implemented by an adjustable threshold in the control system, or even by a pressure sensor in the pipeline network.

The storage facility 3 has a compressor 9 which further pressurises carbon dioxide received from the pipeline network and an injection apparatus 10 which injects the further pressurised carbon dioxide into the geological formation 4.

Like the power plant compressors 5, the storage facility compressor 9 also has a control system 11 which varies the power of the compressor, and a measuring system 12. In this case the measuring system is a pressure sensor which measures the pressure in the formation. The measurement signal is acted on by the control system 11 so that as the formation pressure varies, the power of the compressor also varies. This helps to ensure that the correct injection pressure is used and that the compressor adapts to the changing capacity of the formation.

Buffers 8 (i.e. carbon dioxide storage vessels) allow the system to compensate for any transients in the amount of carbon dioxide produced and compressed when ramping up/down the capacity of the power stations. This also helps to ensure stable transmission conditions on the pipeline network. In FIG. 1 the buffers are shown on the pipeline network side of the compressors 5. However, in other embodiments buffers could be positioned between a power plant and its compressor, on the backbone of the pipeline network, or at the storage facility 3 (e.g. between the compressor 9 and injection apparatus 10).

The compressor control system 11, while being driven by the formation pressure can also be influenced by the carbon dioxide pressure in the pipeline network. This can be implemented by a pressure sensor in the pipeline network.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A carbon dioxide sequestration system having:
one or more carbon dioxide production plants,
one or more carbon dioxide storage facilities, and
a pipeline network connecting the production plants to the storage facilities;
wherein the or each production plant has a source compressor which pressurizes carbon dioxide produced by the production plant and introduces the pressurized carbon dioxide to the pipeline network, each compressor including a source measuring system which determines the amount of carbon dioxide produced by the production plant, and a control system which varies the power of the source compressor depending on the determined amount of produced carbon dioxide, wherein the or each production plant has a carbon dioxide source storage buffer between the production plant and the pipeline network, and wherein the or each carbon dioxide storage facility has a storage compressor which pressurizes carbon dioxide received from the pipeline network, the storage facility injecting the pressurized carbon dioxide into a carbon dioxide storage medium.

2. A sequestration system as claimed in claim 1, wherein the production plant is a fossil fuel power station and the source measuring system includes a power sensor which measures the power output of the power station, the measuring system determining the amount of produced carbon dioxide from measured power output.

3. A sequestration system as claimed in claim 1, wherein the storage compressor comprises:

a storage measuring system which determines the pressure in the storage medium, and a control system which varies the power of the storage compressor depending on the determined storage medium pressure.

4. A sequestration system as claimed in claim 1, wherein the source measuring system determines the pressure of carbon dioxide received from the carbon dioxide source, the control system also varying the power of the compressor depending on the determined source pressure.

5. A sequestration system claimed in claim 1, wherein the or each storage facility has a carbon dioxide storage buffer, the storage facility compressor sending the pressurized carbon dioxide to the respective buffer before the pressurized carbon dioxide is injected into the storage medium.

6. A sequestration system as claimed in claim 1, wherein the pipeline network has one or more pipeline carbon dioxide storage buffers for regulating carbon dioxide pressure on the network.

* * * * *